United States Patent [19]

Schoeller

[11] Patent Number: 5,301,824
[45] Date of Patent: Apr. 12, 1994

[54] STACKING COLUMN FOR STORING STORAGE ARTICLES

[75] Inventor: Heinz Schoeller, Rielasingen/Worblingen, Fed. Rep. of Germany

[73] Assignee: Croon & Lucke Maschinenfabrik GmbH, Mengen, Fed. Rep. of Germany

[21] Appl. No.: 957,426

[22] Filed: Oct. 6, 1992

[30] Foreign Application Priority Data

Oct. 9, 1991 [DE] Fed. Rep. of Germany ....... 4133464

[51] Int. Cl.⁵ .............................................. A47F 5/00
[52] U.S. Cl. ................................... 211/150; 211/59.4
[58] Field of Search ..................... 211/150, 149, 59.4; 108/134; 248/176

[56] References Cited

U.S. PATENT DOCUMENTS

| | | | |
|---|---|---|---|
| 4,359,162 | 11/1982 | Mayer et al. | 211/41 |
| 4,572,382 | 2/1986 | Niederprum | 211/150 |
| 4,712,691 | 12/1987 | Grill et al. | 211/150 X |
| 5,005,712 | 4/1991 | Niederprum | 211/150 |

FOREIGN PATENT DOCUMENTS

| | | | |
|---|---|---|---|
| 2930053 | 2/1981 | Fed. Rep. of Germany | 248/176 |
| 0212528 | 12/1983 | Japan | 211/150 |
| 1313784 | 5/1987 | U.S.S.R. | 211/150 |

Primary Examiner—Robert W. Gibson, Jr.
Attorney, Agent, or Firm—Bachman & LaPointe

[57] ABSTRACT

In the case of a stacking column for storing storage articles one on top of the other at mutual intervals on twin-armed ratchet levers, the latter are rotatably mounted on approximately horizontal rotary axles arranged between two wall strips. Each ratchet lever exhibits, on the one hand, a supporting arm for holding the storage article and, on the other hand, a control arm. The two wall strips form an acute angle with a base surface, baseplate or the like. Moreover, the ratchet levers between the two wall strips are arranged successively, laterally offset in the same direction, on the rotary axles.

14 Claims, 3 Drawing Sheets

STACKING COLUMN FOR STORING STORAGE ARTICLES

BACKGROUND OF THE INVENTION

The invention relates to a stacking column for storing storage articles one on top of the other at mutual intervals on twin-armed ratchet levers, which are rotatably mounted on rotary axles arranged approximately horizontally between two wall strips and exhibit, on the one hand, a supporting arm for holding the storage article and, on the other hand, a control arm.

Stacking columns of this type serve, in particular, to receive flat-shaped loading articles, as arise, for example, in the manufacture of automobile parts. However, there are many other fields of application which are intended to be covered by the present invention.

In German Offenlegungsschrift 38 11 310, a stacking column of this type is described, which relates to the stacking of storage articles of approximately the same shape and size at mutual intervals one on top of the other. For this purpose, there are rotatably mounted on the column, one on top of the other on horizontal rotary axles, twin-armed ratchet levers, which in each case exhibit a supporting arm receiving a storage article and a control arm. They can be pivoted out of a rest position, via a stand-by position, into an operating position and back again. When a storage article is mounted, a ratchet lever located in the stand-by position makes its way into its operating position and, at the same time, a ratchet lever arranged above, as a result of the control arm of the ratchet lever reaching the operating position, makes its way out of its rest position into its stand-by position. Furthermore, the ratchet levers which are located in the operating position are herewith locked against one another in this position. These ratchet levers are alternately laterally offset in relation to one another and are arranged such that they slide past one another.

This stacking column has proved excellent for receiving a flat loading article. However, difficulties arise in particular in the case of a loading article which has high protuberances, so that a loading article arranged above can only be arranged at a distance from this high protuberance. This can apply for example to a trunk compartment lid, which, although it exhibits, on the one hand, a flat and even flow, is drawn downwards, on the other hand, by an apron. This apron produces an angled bending, which makes the edge of the trunk compartment lid rise upwards. If a further panel is then arranged directly above it, then this must maintain a considerable distance due to the angled bending. Accordingly, a space which is offered by the stacking columns is under-utilized.

SUMMARY OF THE INVENTION

The object of the present invention is to remedy this disadvantage.

This object is achieved by the fact that the two wall strips form an acute angle with a base surface, baseplate or the like, and the ratchet levers between the two wall strips are arranged successively, laterally offset in the same direction, on the rotary axles.

This ensures that, in particular, storage articles having the above-described high protuberance can be arranged laterally offset to one another, so that precisely these high outformings are able to mutually overlap. The space between two storage articles does not need to correspond to these protuberances in terms of height, but can be substantially reduced. This enables substantially more storage articles to be stored between corresponding stacking columns. This space-saving entails considerable advantages.

Whereas, in the case of the vertical stacking columns, the arrangement of the rotary axles barely poses any difficulties, this can very easily be a possibility where there are slanted wall strips. Here too the present invention offers the prospect of a solution which substantially facilitates the assembly of the stacking column. This purpose is served, above all, by fastening elements which hold the rotary axle. These fastening elements comprise a basic body from which stop shoulders are formed-out. The basic body is inserted into a corresponding recess in the wall strip, so that the stop faces formed by the stop shoulders bear against the wall strip. Outwardly, the basic body forms a rear wall running approximately parallel to the wall strip, inwardly it forms, by contrast, a front face running radially to the rotary axle. The latter serves, above all, as the stop for a distance sleeve which is to be described later.

The rotary axle is seated in bores in these fastening elements, these bores naturally forming with the rear wall the same angle by which the wall strips are also slanted in relation to the base surface. The effect of this is that the rotary axles are arranged horizontally, i.e. parallel to the base surface.

The same shape is chosen for the fastening element on both sides of the rotary axle, it merely being rotated by 180°.

The assembly is extraordinarily facilitated. From both sides, a fastening element is in each case inserted into the corresponding recess in the wall strip, the rotary axle being pushed into the respective bore in the fastening elements. On the rotary axle there is found, in the direction of inclination of the stacking column, firstly the ratchet lever and then a distance sleeve, which distance sleeve ensures that the ratchet lever remains approximately in its desired position. There then follows a securement of the fastening element, which for simplicity's sake, is realized by means of a strip which bears down on a plurality of fastening elements or their rear walls. The strip is then screwed tight to the wall strip.

The working method of the ratchet levers themselves is similar to that described in German Offenlegungsschrift 38 11 310.4. Here, however, the ratchet lever is passed through by a control pin, the control pin projecting on both sides out of the ratchet lever. That part of the control pin which is aligned towards the direction of inclination of the stacking column herewith serves the automatic actuation of the ratchet lever in interaction with a catch on the control arm of the next lower ratchet lever. This catch butts against the part of the control pin and, upon rotation of the lower ratchet lever, causes the next higher ratchet lever to swivel out into a stand-by or operating position.

The other part of the control pin interacts, by contrast, with the next following upper ratchet lever, the latter possessing a guiding edge by means of which the lower ratchet lever is locked in an operating position. Both the swiveling-out of the next following ratchet lever and the locking of the next lower ratchet lever is carried out automatically whenever a loading article is placed onto the ratchet lever.

The return guidance of the ratchet levers after the loading article has been lifted off, as likewise described in German Offenlegungsschrift 38 11 310, occurs automatically by virtue of the fact that the control arm exhibits a greater weight than the supporting arm. It has been shown in practice, in this regard, that in some cases the weight difference cannot suffice or is inadequate. For this reason, an additional weight is preferably arranged on the control arm. This can be a metal of higher density, for example. For the insertion of this weight, there is provided in the control arm a recess, which however, at least in a specific area, is open. Should the shape of the weight therefore exhibit a non-precise fit with the recess, then the recess is able, to a limited extent, to yield. The insertion of the weight is thereby facilitated.

As is likewise known, the lowermost ratchet lever should always be in the stand-by position. It does not therefore need to be swiveled into a rest position. This is guaranteed by a stop pin, which, in the present illustrative embodiment, is preferably held by fastening elements which essentially correspond to the above-described fastening elements for the rotary axles. This stop pin, however, preferably reaches through the fastening elements and is in each case secured at the other end by a splint or the like. Its installation is also thereby made substantially easier.

BRIEF DESCRIPTION OF THE DRAWINGS

Further advantages, features and details of the invention are derived from the following description of preferred illustrative embodiments and with reference to the drawing, in which.

DETAILED DESCRIPTION OF PREFERRED EMBODIMENTS

Figure 2:
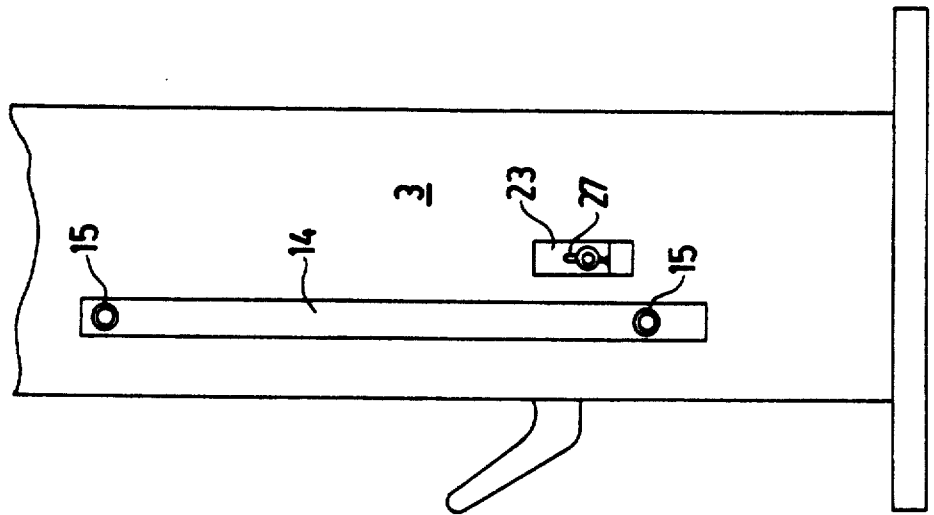
FIG. 2 shows a view of the stacking column according to FIG. 1, in the direction of the arrow A.
Figure 1:
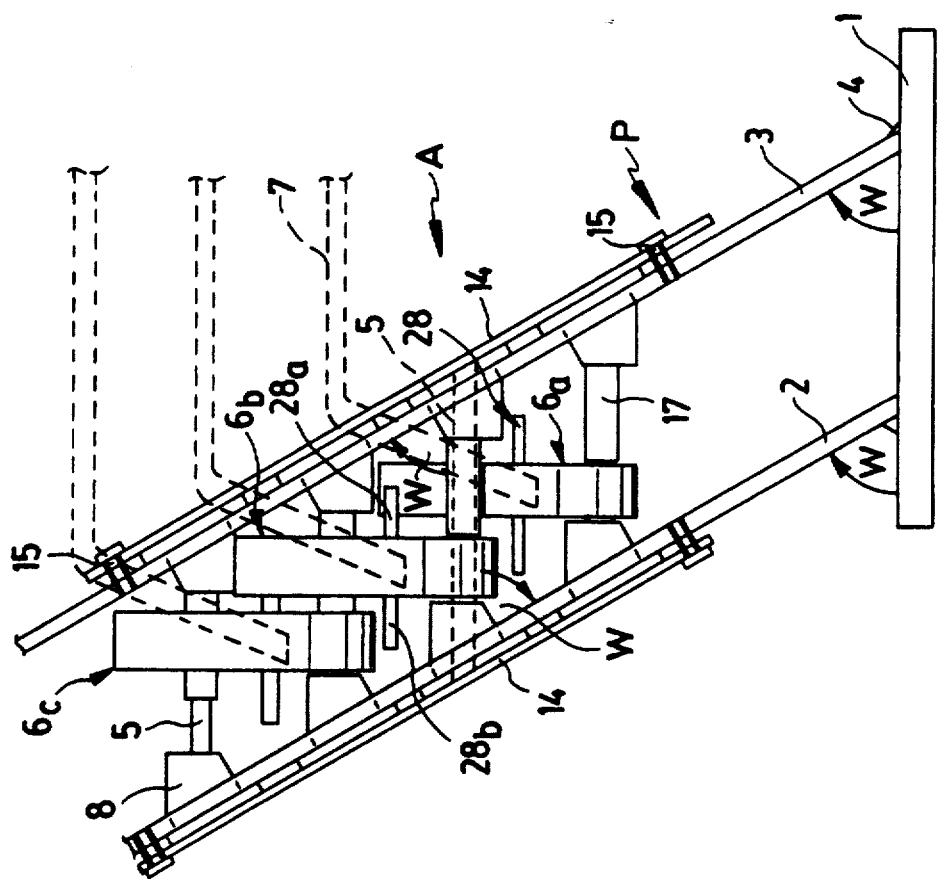
FIG. 1 shows a side view of one part of a stacking column according to the invention.

According to FIG. 1, two wall strips 2 and 3 are mounted on a plate 1 and connected, for example by means of an appropriate weld seam 4, to the baseplate 1. Each wall strip 2 and 3 forms an acute angle w with the baseplate 1. In this way, the wall strips 2 and 3 are slanted in the usage situation.

The walls 2 and 3 are passed through, at specific intervals, by rotary axles 5, which likewise form acute angles w with the wall strips 2 and 3. In this way, the rotary axles 5 are arranged in the plane of the baseplate 1. Since the baseplate 1 generally stands on the floor of a hall and is thus arranged horizontally, the rotary axles 5 likewise run horizontally.

In the present illustrative embodiment, only four rotary axles 5 are shown, the number of rotary axles 5 being able to be optionally increased and being dependent upon the length of the wall strips 2 and 3.

Each rotary axle 5 holds a ratchet lever 6, three ratchet levers 6a, 6b, and 6c being represented in the present illustrative embodiment. The ratchet levers serve the storage of a storage article 7 (indicated only as a dotted line), which is shaped such that a storage which took place vertically one above the other would take up too much space. The present stacking column P is intended to be particularly suitable for storage articles 7 which are shaped in this way, but it can also be used for normally shaped storage articles.

Figure 6:
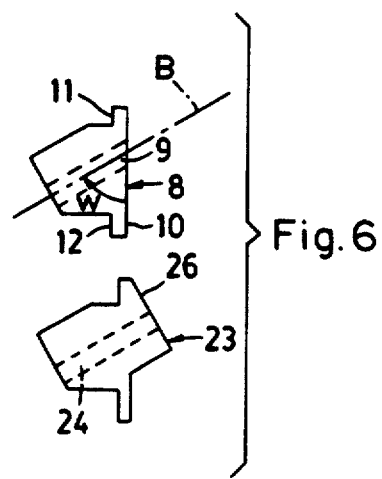
FIG. 6 shows a top view onto two preferred fastening elements for ratchet levers and stop pin.

An essential factor in the present case is the fastening of the rotary axles 5. This is served by fastening elements 8, as shown in particular in FIG. 6. Each fastening element 8 exhibits a bore 9, into which, in the usage situation, the rotary axle 5 is inserted. This bore 9 possesses an axis B, which runs at the angle w to a rear wall 10 or to stop faces 11 and 12 which are formed by shoulders of the fastening element 8.

In the usage situation, fastening elements 8 of this type are inserted into corresponding recesses 13 in each wall strip 2 or 3, the stop faces 11 and 12 bearing from outside against these wall strips 2 and 3 and hence also limiting the insertion depths of the fastening element 8. Two opposing fastening elements 8 are inserted into the recesses 13, turned by an angle of 180° with respect to each other. Between them extends the rotary axle 5.

Figure 5:
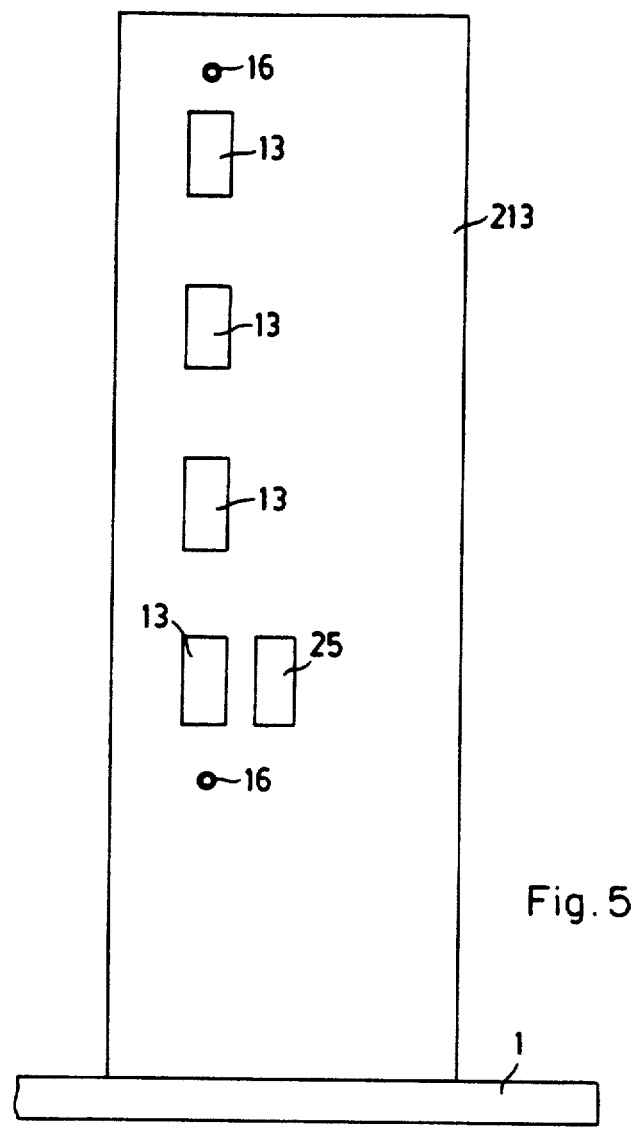
FIG. 5 shows a view of a wall strip according to FIG. 2, prior to the insertion of ratchet levers and corresponding fastening elements.

The securement of a plurality of fastening elements 8 is served by a strip 14, which, in the usage situation, bears against the rear wall 10 of a plurality of fastening elements 8 and is connected by appropriate screws 15 to the wall strips 2 or 3. In this case, these screws 15 engage into corresponding bores 16 (FIG. 5) having an internal thread. Of course, it is also conceivable for the fastening elements to be glued or otherwise secured to the wall strips.

The fastening elements 8 allow, however, a fast and equal arrangement of the rotary axles 5, the assembly, above all, being substantially facilitated. Once the wall strips 2 and 3 are secured at the desired angle on the baseplate 1, the fastening elements are inserted into the recesses 13. As soon as a fastening element 8 is inserted from the one side into its recess 13, the rotary axle 5 is pushed into the bore 9, a distance sleeve 17 is then pushed onto the rotary axle 5 and, afterwards, the ratchet lever 6 is mounted onto the free area of the rotary axle 5. From the other side, a corresponding fastening element 8, rotated by 180°, is then inserted into the corresponding recess 13 and receives the rotary axle 5 in its bore 9. Once a plurality of ratchet levers 6 are arranged in this way along the stacking column P, the fastening elements 8 or a specific number of fastening elements 8 are fixed definitively in their situation by the strips 14.

Figure 4:
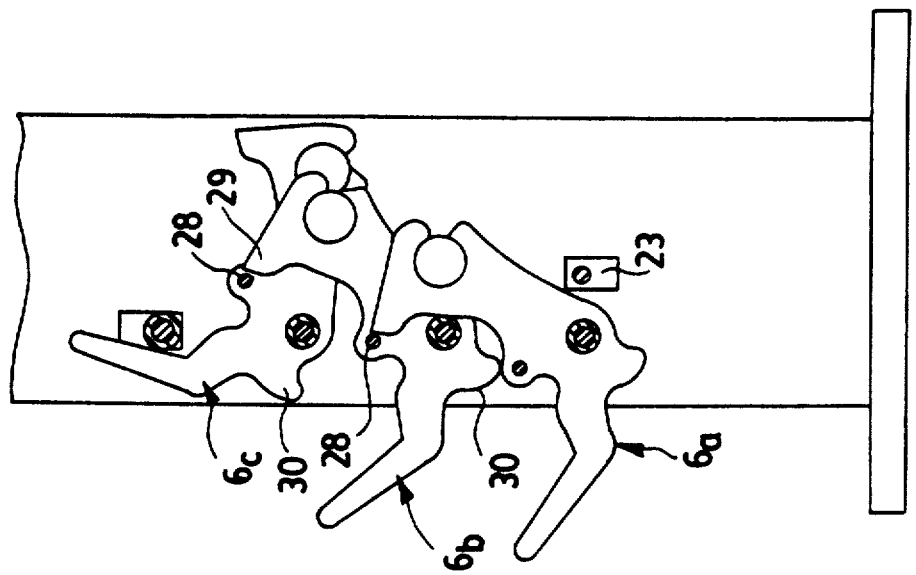
FIG. 4 shows a view of the stacking column according to FIG. 3, but in a further usage situation.
Figure 3:
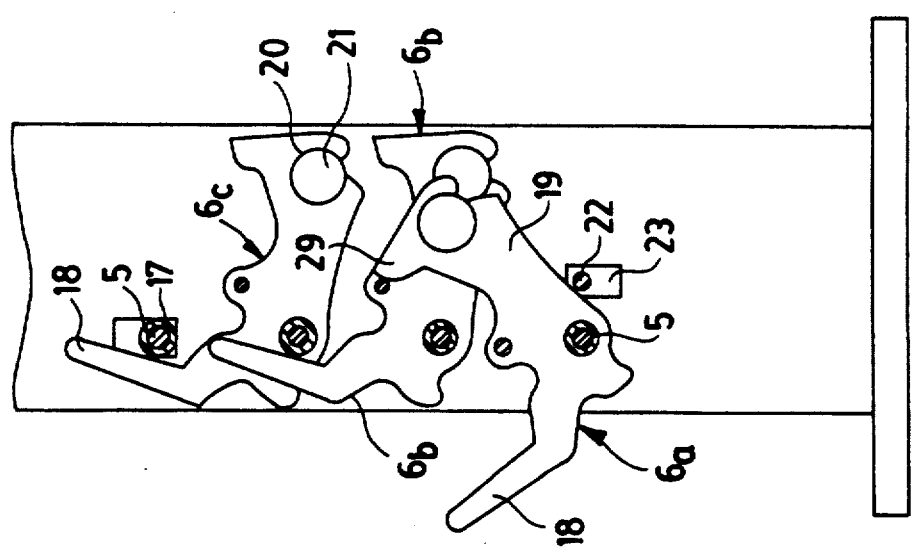
FIG. 3 shows a view of the stacking column according to FIG. 2, but following the removal of a wall strip.

In FIGS. 3 and 4, it can be seen that each ratchet lever 6 comprises a supporting arm 18 and a control arm 19. Both arms 18 or 19 are arranged on both sides of the rotary axle 5. However, the control arm 19 herewith possesses a greater weight than the supporting arm 18, an additional weight 21 being in this case able to be additionally inserted into a corresponding recess 20 in the control arm 19. For simplicity's sake, the recess 20 is formed by a bore in the control arm 19, the recess being open. In the event of non-precise fits with the weight 21, the control arm is in this case able, to a limited extent, to yield, so that the insertion of the weight 21 is facilitated by the pressing of the weight 21 into the recess 20.

The effect of the weight distribution or the additional weight 21 is that each ratchet lever 6, apart from the lowermost ratchet lever 6a, is normally found in the rest position, as is indicated in FIG. 3 for the ratchet levers 6b and 6c. In this rest position, the ratchet levers 6b and 6c are held by the fact that the supporting arm 18 butts either against an above-situated fastening element 8 or, indeed, against the rotary axle 5 or the distance sleeve 17. In this rest position, the ratchet lever 6b or 6c disappears in any event between the wall strips 2 and 3, so that any charging of the stacking column P is not disrupted.

The lowermost ratchet lever 6a, by contrast, is found in any event in the stand-by position, in which the supporting arm 18 is swiveled out of the area of the wall strips 2 or 3. In order to hold the ratchet lever 6a in this stand-by position, a stop pin 22 is provided, which is likewise held between the two wall strips 2 and 3 by fastening elements 23 (see FIG. 6). A fastening element 23 is configured slightly differently from the fastening element 8. It too exhibits a longitudinal bore 24 for receiving the stop pin 22 and is inserted into a corresponding recess 25 next to the recess 13 for the lowermost ratchet lever 6a. Its rear wall 26 is however of bevelled configuration and sleeves, in the usage situation, as a stop for a splint 27, which is inserted into the stop pin 22 in order to hold it in place, i.e. the stop pin 22 is configured to be of such a length that it projects on both sides out of its respective fastening element 23.

Each ratchet lever 6 further exhibits a control pin 28, which traverses, and on both sides protrudes beyond, the ratchet lever 6. The one part 28a of the control pin 28 interacts with the lower ratchet lever and the other part 28b with the upper ratchet lever. Since each distance sleeve 17 is located on the same side of its ratchet lever, the ratchet levers 6 along a stacking column are mutually offset in the same direction. It can be seen that the lowermost ratchet lever 6a interacts by virtue of a catch 29 on its control arm 19 with the one part 28a of the control pin 28 of the succeeding ratchet lever 6b. If the lowermost ratchet lever 6a is swiveled from its stand-by position into an operating position, as this is indicated in FIG. 4, the catch 29 presses onto the control pin 28 and thereby swivels the succeeding ratchet lever 6b into the stand-by position.

If this ratchet lever 6b is now loaded with a loading article 7, it likewise swivels into the operating position, the catch 29 of its control arm 19 pressing in turn onto the control pin 28 and thereby swiveling the succeeding ratchet lever 6c into the stand-by position. At the same time, however, the ratchet lever 6b overlaps, by means of a guiding edge 30, the other part 28b of the control pin 28 of the lowermost ratchet lever 6a and presses onto this, so that this lowermost ratchet lever is fixed in its operating position.

Moreover, if the ratchet lever 6c is then loaded, its guiding edge interacts, for locking purposes, with the control pin 28 of the ratchet lever 6b. This working method can optionally be continued.

Upon unloading, as a result of the, in each case, upper ratchet lever falling back, an immediate unlocking of the succeeding ratchet lever is also effected, so that, upon unloading, this is in turn able to fall back into its stand-by position and subsequently into its rest position.

I claim:
1. Stacking column for storing storage articles one on top of the other at mutual intervals, which comprises twin-armed ratchet levers, which are rotatably mounted on rotary axles arranged approximately horizontally between two wall strips and exhibit, on the one hand, a supporting arm for holding the storage article and, on the other hand, a control arm, wherein the two wall strips form an acute angle with at least one of a base surface and a baseplate, and the ratchet levers between the two wall strips are arranged successively, lateral offset in the same direction, on the rotary axles.

2. Stacking column as claimed in claim 1, wherein each rotary axle is held by fastening elements to the wall strips.

3. Stacking column as claimed in claim 2, wherein the fastening element includes a rear wall and stop faces, and wherein said fastening elements also includes a bore which is arranged at the acute angle to at least one of said rear wall and said stop faces.

4. Stacking column as claimed in claim 3, wherein the stop face, in the usage situation, butt from outside against the wall strips, the fastening elements being inserted into recesses in the wall strips.

5. Stacking column as claimed in claim 4, wherein the rotary axle is inserted into the bore, a distance sleeve of the rotary axle being pushed on, in each case on one side, between a fastening element and the ratchet lever.

6. Stacking column as claimed in claim 5, wherein a plurality of adjacent fastening elements are covered by a strip.

7. Stacking column as claimed in claim 6, wherein the strip is secured to the wall strips by means of screws.

8. Stacking column according to claim 1, wherein each ratchet lever is passed through by a control pin, which projects on both sides out of the ratchet lever.

9. Stacking column as claimed in claim 8, wherein one part of the control pin of one ratchet lever interacts by virtue of a catch on a control arm of the succeeding lover ratchet lever for the swiveling-out of the one ratchet lever.

10. Stacking column as claimed in claim 9, wherein a part of the control pin of the lower ratchet lever interacts with a guiding edge of the succeeding upper ratchet lever for locking the lower ratchet lever in its operating position.

11. Stacking column according to claim 9, wherein a recess for receiving a weight is provided on the control arm.

12. Stacking column as claimed in claim 11, wherein the recess is open in a specific area.

13. Stacking column according to claim 1, wherein the lowermost ratchet lever is allocated a stop pin, which holds the lowermost ratchet lever in a stand-by position for receiving a loading article.

14. Stacking column as claimed in claim 13, wherein the stop pin reaches through fastening elements and is secured at the other end by a splint.

* * * * *